United States Patent
Yae

(10) Patent No.: US 10,542,401 B2
(45) Date of Patent: Jan. 21, 2020

(54) METHOD OF CHANGING AUDIO OUTPUT MODE OF VEHICLE CONSIDERING SOUND OUTPUT OF SMART DEVICE AND APPARATUS THEREFOR

(71) Applicant: HYUNDAI MOTOR COMPANY, Seoul (KR)

(72) Inventor: Seong Soo Yae, Gyeonggi-do (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 100 days.

(21) Appl. No.: 15/335,081

(22) Filed: Oct. 26, 2016

(65) Prior Publication Data

US 2017/0195474 A1 Jul. 6, 2017

(30) Foreign Application Priority Data

Jan. 5, 2016 (KR) .......................... 10-2016-0000801

(51) Int. Cl.
*H04W 4/80* (2018.01)
*H04B 1/3822* (2015.01)
*H04M 1/60* (2006.01)

(52) U.S. Cl.
CPC ............ *H04W 4/80* (2018.02); *H04B 1/3822* (2013.01); *H04M 1/6091* (2013.01)

(58) Field of Classification Search
USPC .................................................. 455/415, 403
See application file for complete search history.

(56) References Cited

U.S. PATENT DOCUMENTS

| | | | |
|---|---|---|---|
| 2002/0164973 A1* | 11/2002 | Janik ................... | G11B 27/10 455/403 |
| 2004/0234242 A1* | 11/2004 | Akita ................... | G11B 19/025 386/243 |
| 2008/0147321 A1* | 6/2008 | Howard ............... | G01C 21/367 701/431 |

(Continued)

FOREIGN PATENT DOCUMENTS

| | | |
|---|---|---|
| JP | 2007505098 A | 3/2007 |
| JP | 2008026111 A | 2/2008 |

(Continued)

OTHER PUBLICATIONS

Notice of Allowance dated Aug. 1, 2017 issued in Korean Patent Application No. 10-2016-0000801.

*Primary Examiner* — Ganiyu A Hanidu
(74) *Attorney, Agent, or Firm* — Morgan, Lewis & Bockius LLP

(57) ABSTRACT

Disclosed are a vehicle capable of changing an audio output mode according to audio streamed from a smart device connected thereto and a control method therefor. A method of changing an audio output mode in a vehicle Audio Video Navigation (AVN) system include setting a steaming channel through wireless connection to a smart device and the AVN system, determining whether navigation announcement voice is detected from streaming data received through the streaming channel, and if the navigation announcement voice is detected, changing the audio output mode from a mode in which the navigation announcement voice is not output through a vehicle speaker to a streaming mode in which the navigation announcement voice is output through the vehicle speaker.

6 Claims, 3 Drawing Sheets

(56) References Cited

U.S. PATENT DOCUMENTS

| | | | |
|---|---|---|---|
| 2010/0153114 A1* | 6/2010 | Shih | G10L 13/00 704/260 |
| 2012/0110511 A1* | 5/2012 | Howard | G01C 21/36 715/835 |
| 2014/0133672 A1* | 5/2014 | Lakkundi | H04R 3/12 381/80 |
| 2014/0220948 A1* | 8/2014 | Xia | H04W 4/046 455/415 |
| 2014/0244156 A1* | 8/2014 | Magnusson | G01C 21/30 701/418 |
| 2015/0025917 A1* | 1/2015 | Stempora | G06Q 40/08 705/4 |
| 2015/0046022 A1* | 2/2015 | Bai | G07C 5/008 701/31.5 |
| 2015/0099495 A1* | 4/2015 | Crosbie | B60W 50/14 455/414.3 |
| 2015/0192426 A1* | 7/2015 | Foster | G01C 21/3629 715/765 |
| 2017/0195708 A1* | 7/2017 | Morales | H04M 1/72527 |
| 2017/0332134 A1* | 11/2017 | Iwami | H04N 21/436 |

FOREIGN PATENT DOCUMENTS

| | | |
|---|---|---|
| JP | 2010-505098 A | 2/2010 |
| JP | 2010505097 A | 2/2010 |
| JP | 2012-518789 A | 8/2012 |
| KR | 10-2009-0044219 A | 5/2009 |
| KR | 10-2013-0017269 A | 2/2013 |
| KR | 10-1330826 B1 | 11/2013 |
| KR | 10-2014-0005561 A | 1/2014 |
| KR | 10-2014-0051473 A | 5/2014 |

\* cited by examiner

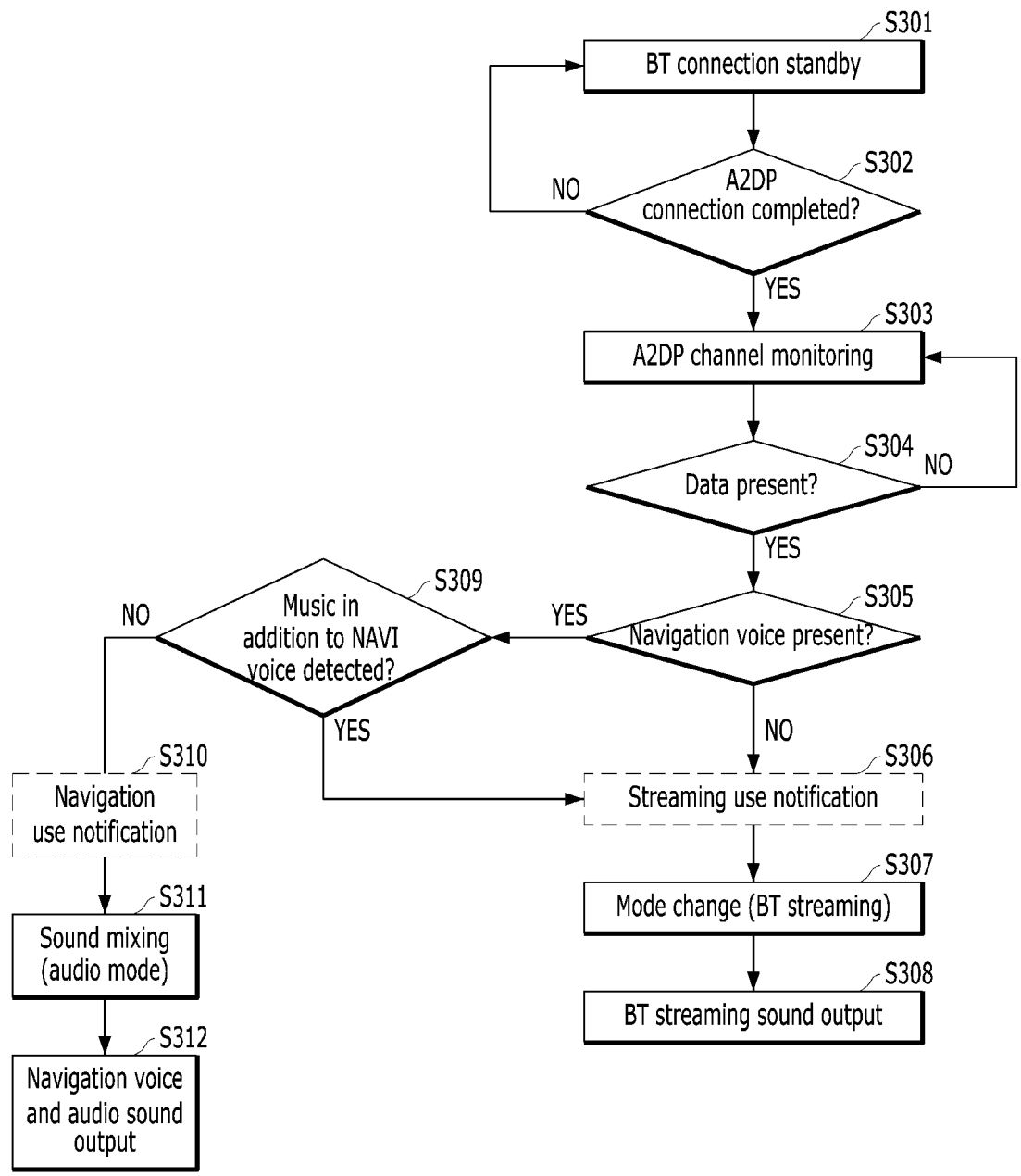

METHOD OF CHANGING AUDIO OUTPUT MODE OF VEHICLE CONSIDERING SOUND OUTPUT OF SMART DEVICE AND APPARATUS THEREFOR

CROSS-REFERENCE TO RELATED APPLICATION

This application claims the benefit of Korean Patent Application No. 10-2016-0000801, filed on Jan. 5, 2016, which is hereby incorporated by reference as if fully set forth herein.

TECHNICAL FIELD

The present disclosure relates to a vehicle capable of changing an audio output mode according to audio streamed from a smart device connected thereto and a control method therefor.

BACKGROUND

Recently, in the case where a vehicle includes an embedded navigation system as well as in the case where the vehicle does not include a navigation system therein, many drivers have frequently used a navigation function executed through a smart device such as a smartphone or a tablet.

Generally, a driver connects (pairs) a smart device to (with) a vehicle through wireless communication technology such as Bluetooth for the purpose of a handsfree function or audio streaming and the driver receives navigation information through the smart device if the vehicle does not include the embedded navigation system. Even when the vehicle includes an embedded navigation system, the drivers prefers a navigation function executed through the smart device due to convenience of update and ease of acquisition of real-time traffic information or destination information.

If the navigation function is executed through the smart device, a map or visual guide information (directional arrows, distance information, etc.) may be directly checked through a display of the smart device. However, in a situation in which the smart device is paired with the vehicle, sound of the smart device, such as voice for navigation announcement, is generally transmitted to the vehicle without being output through a speaker of the smart device. More specifically, if an audio streaming channel such as an Advanced Audio Distribution Profile (A2DP) channel is formed between the vehicle and the smart device as Bluetooth pairing is performed, sound generated from the smart device is streamed to a vehicle speaker. Accordingly, a driver expects that navigation voice announcement will be output through the vehicle speaker. However, the navigation system outputs only sound corresponding to an audio output mode through the vehicle speaker. Therefore, even if the smart device transmits navigation announcement voice to the vehicle through audio streaming, the announcement voice is not output through the vehicle speaker unless the driver directly changes the audio output mode to a Bluetooth streaming mode.

As a result, it is inconvenient for drivers not to hear navigation announcement voice through the vehicle speaker and the smart device unless they directly change the audio output mode.

SUMMARY

Accordingly, the present disclosure is directed to a vehicle capable of more conveniently changing an audio output mode and a control method therefor that substantially obviate one or more problems due to limitations and disadvantages of the related art.

An object of the present disclosure is to provide a vehicle capable of automatically changing an audio output mode to a streaming mode when a navigation function is executed through a smart device connected thereto and a control method therefor.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these objects and other advantages and in accordance with the purpose of the disclosure, as embodied and broadly described herein, a method of changing an audio output mode in a vehicle Audio Video Navigation (AVN) system includes setting a steaming channel through wireless connection to a smart device and the AVN system, determining whether navigation announcement voice is detected from streaming data received through the streaming channel, and if the navigation announcement voice is detected, changing the audio output mode from a mode in which the navigation announcement voice is not output through a vehicle speaker to a streaming mode in which the navigation announcement voice is output through the vehicle speaker.

In another aspect of the present disclosure, a vehicle Audio Video Navigation (AVN) system for changing an audio output mode includes a wireless communication module configured to set a steaming channel through wireless connection to a smart device, a voice data analyzer configured to detect navigation announcement voice from streaming data received through the streaming channel, and a processor configured to change the audio output mode from a mode in which the navigation announcement voice is not output through a vehicle speaker to a streaming mode in which the navigation announcement voice is output through the vehicle speaker, when the navigation announcement voice is detected as a detection result.

In another aspect of the present disclosure, a method of changing an audio output mode in a vehicle Audio Video Navigation (AVN) system includes setting a streaming channel through wireless connection between a smart device and the AVN system, determining whether navigation announcement voice is detected from streaming data received through the streaming channel, and if the navigation announcement voice is not present or both the navigation announcement voice and music are present, changing the audio output mode to a first mode for outputting streaming audio.

In another aspect of the present disclosure a vehicle Audio Video Navigation (AVN) system for changing an audio output mode includes a wireless communication module configured to set a streaming channel through wireless connection to a smart device, a voice data analyzer configured to detect navigation announcement voice from streaming data received through the streaming channel, and a processor configured to change the audio output mode to a first mode for outputting streaming audio when the navigation announcement voice is not present or both the navigation announcement voice and music are present. The first mode is a mode in which only the music is output through a vehicle speaker.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings:

FIG. 3 is a flowchart illustrating another exemplary process of performing automatic mode change in an AVN system according to an embodiment of the present disclosure.

DETAILED DESCRIPTION

Figure 1:
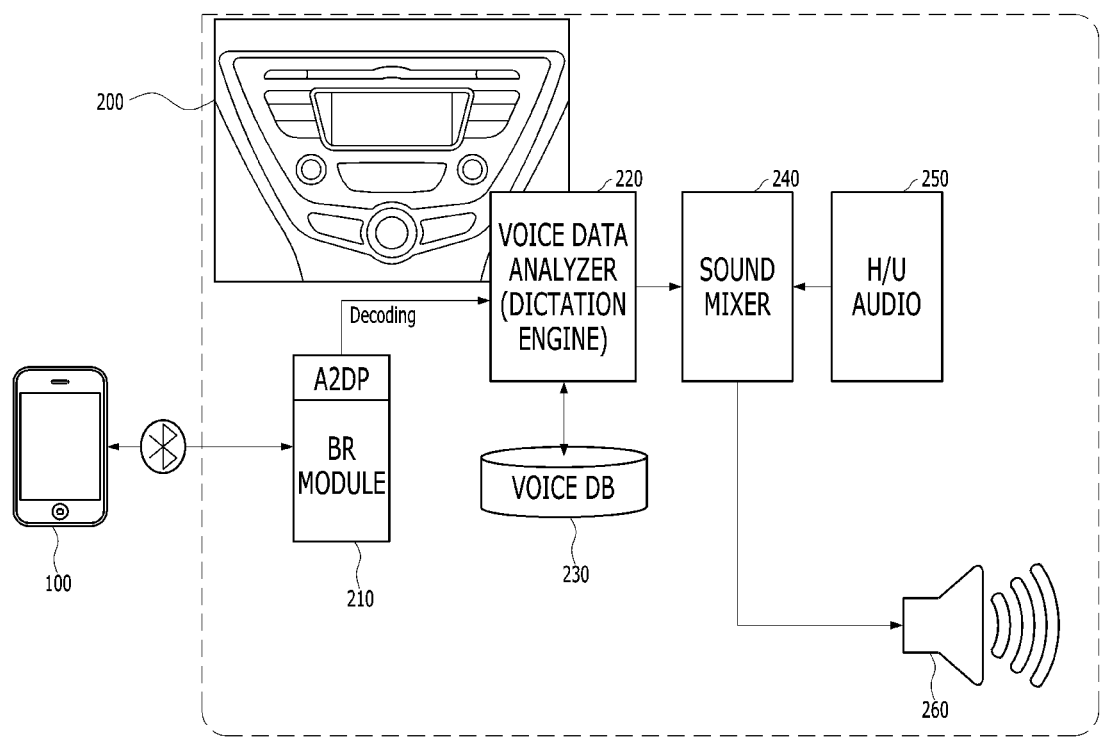
FIG. 1 illustrates the configuration of an AVN system according to an embodiment of the present disclosure.

Reference will now be made in detail to the embodiments of the present disclosure, examples of which are illustrated in the accompanying drawings. In the drawings, the same or similar elements are denoted by the same reference numerals even though they are depicted in different drawings, and a detailed description of the same or similar elements will be omitted. The suffixes "module" and "unit" used in the description below are given or used together only in consideration of ease in preparation of the specification and do not have distinctive meanings or functions.

In addition, in the following description of the embodiments disclosed herein, a detailed description of related known technologies will be omitted when it may make the subject matter of the embodiments disclosed herein rather unclear. In addition, the accompanying drawings have been made only for a better understanding of the embodiments disclosed herein and are not intended to limit technical ideas disclosed herein, and it should be understood that the accompanying drawings are intended to encompass all modifications, equivalents and substitutions within the sprit and scope of the present disclosure.

An embodiment of the present disclosure proposes, if audio streaming is started from a smart device connected to a vehicle, determining whether a navigation function is executed through a smart device, using the streamed audio, and, if it is determined that the navigation function is executed, automatically changing an audio output mode to a Bluetooth streaming mode.

Determination as to whether the navigation function is executed may be performed by monitoring the streamed audio. In more detail, the vehicle performs voice recognition for the streamed audio and, if voice corresponding to announcement voice is detected, the vehicle may determine that the navigation function is performed through the smart device.

According to an aspect of the present embodiment, if streamed audio is detected although announcement voice is not detected, the audio output mode of the vehicle may automatically be changed to the Bluetooth streaming mode for listening to music.

According to another aspect of the present disclosure, if only announcement voice is detected while audio sound has been output through a vehicle speaker, both sound streamed from the smart device and sound output from the vehicle speaker may be mixed and output through the vehicle speaker.

The configuration of a system for carrying out embodiments of the present disclosure will now be described with reference to FIG. 1.

FIG. 1 illustrates the configuration of an AVN system according to an embodiment of the present disclosure.

Referring to FIG. 1, an AVN system 200 according to the present embodiment may include a Bluetooth (BT) module 210 paired with a smart device capable of executing a navigation function to thereby constitute a streaming (A2DP) channel, a voice data analyzer 220 for decoding sound carried over the streaming channel and detecting announcement voice of the navigation function through voice recognition technology (dictation engine), a voice database (DB) 230 for providing reference items used to compare voice recognized by the voice data analyzer 220 corresponds to announcement voice, a Head Unit (H/U) audio 250, and a sound mixer 240 for selectively mixing streamed sound and sound of the H/U audio 250 according to an audio output mode and transmitting mixed sound to a speaker 260.

The H/U audio 250 may include a radio, a Digital Multimedia Broadcasting (DMB) player, a Compact Disc (CD) player, an MP3 player, etc. The voice DB 230 may include a predetermined type of memory and announcement voice reference items stored therein may include, for example, "left turn", "right turn", "U-turn", "go strait", "join", "1 kilometer", and "2 kilometers". However, this is purely exemplary and it is apparent to those skilled in the art that more or fewer reference items than those mentioned above may be stored.

Although not shown in FIG. 1, the AVN system of the vehicle according to an embodiment of the present disclosure may further include a processor for controlling overall operation of the above-described elements and determining/changing an audio output mode according to an announcement voice detection result of the voice data analyzer 220.

A process of performing automatic mode change in the above AVN system will now be described with reference to FIG. 2.

Figure 2:
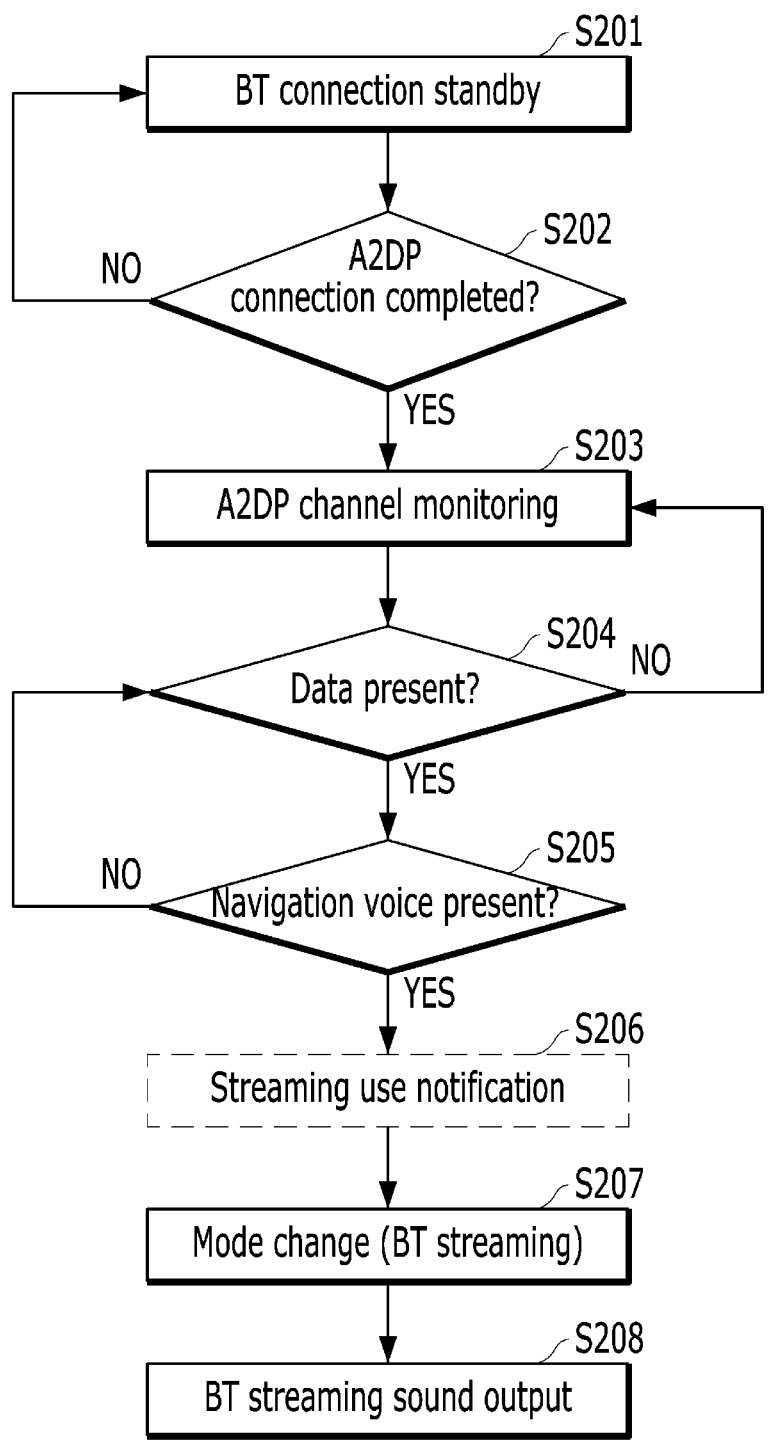
FIG. 2 is a flowchart illustrating an exemplary process of performing automatic mode change in an AVN system according to an embodiment of the present disclosure.

FIG. 2 is a flowchart illustrating an exemplary process of performing automatic mode change in an AVN system according to an embodiment of the present disclosure.

Referring to FIG. 2, the AVN system detects a BT device (i.e., a smart device) that can be connected thereto and prepares to pair with the detected device (S201). If pairing with the smart device and A2DP connection according to pairing are completed (S202), the AVN system monitors an A2DP channel (S203) and determines whether there is streaming data received through the A2DP channel (S204). If streaming data received through the A2DP channel is present, the AVN system may determine whether navigation announcement voice is detected from the data (S205). As described above, the AVN system may detect the announcement voice by applying a method of performing voice recognition for decoded streaming data and comparing a voice recognition result with reference items of the voice DB.

If the navigation announcement voice is detected, the AVN system may automatically change an audio output mode into a BT streaming mode in order to output announcement voice through a speaker of a vehicle (S207).

Prior to change of the audio output mode, the AVN system may notify a driver in advance that the mode is to be automatically changed or may optionally receive a mode change command from the driver according to setting (S206).

If the audio output mode is changed, the streamed announcement voice may be output through the speaker of the vehicle (S208).

Although the audio output mode is changed to the BT streaming mode only if announcement voice is present in the streaming data, whether normal music is included in the streaming data may further be considered for mode change. This will now be described with reference to FIG. 3.

FIG. 3 is a flowchart illustrating another exemplary process of performing automatic mode change in an AVN system according to an embodiment of the present disclosure.

Steps S301 to S304 of FIG. 3 correspond respectively to steps S201 to S204 of FIG. 2 and, therefore, a repeated description is omitted for clarity of the present disclosure.

If the streaming data received through the A2DP channel is present, the AVN system determines whether navigation announcement voice is detected from the data (S305) and, if the announcement voice is not detected, the AVN system may judge that normal music is included in the streaming data. In this case, to judge whether normal music is included in the steaming data, determination as to whether irregular sound is continuously generated for a predetermined time (e.g., 5 seconds) may be performed (i.e., if irregular sound is continuously generated for a predetermined time or more, it is determined that music is included). This determination is performed to prevent change of the audio output mode when a button according to manipulation of a smart device by a driver is pressed.

If only music without navigation voice is included in the streaming data, the AVN system may automatically change the audio output mode to a BT streaming mode in order to output streamed music through a speaker (S307). Prior to change of the audio output mode, the AVN system may notify the driver in advance that the mode is to be automatically changed or may optionally receive a mode change command from the driver according to setting (S306).

If the audio output mode is changed, the streamed music may be output through the speaker of the vehicle (S308).

If navigation announcement voice is detected in step S305, whether another sound is detected in addition to the navigation announcement voice from the streaming data may be judged (S309). If so, there is a high probability of no necessity of performing mixing with sound of a H/U audio because it is determined that the driver simultaneously uses a music play function and a navigation function through the smart device. Accordingly, in this case, the audio output mode may be changed to the BT streaming mode automatically (S307) or according to selection by a user (S306).

If no other sound is detected in S309, that is, if only the navigation announcement voice is detected, the AVN system optionally notifies the driver of mode change and then is operated in an audio mode in which streamed announcement voice and sound of the H/U audio are mixed and output (S311) according to selection of a user (S310) or automatically. Therefore, the driver listens to music output from the H/U audio and navigation announcement voice of the smart device through the speaker of the vehicle (S312).

According to at least one embodiment of the present disclosure, the following effects are obtained.

An audio output mode is automatically changed in consideration of audio output of a smart device connected to a vehicle, thereby achieving user convenience.

In particular, if a navigation function is executed through the smart device connected to the vehicle, the vehicle senses this navigation execution and changes the audio output mode to output navigation announcement voice, thereby providing greater convenience during navigation execution through the smart device.

The present disclosure may be implemented as computer-readable code that can be written on a computer-readable medium in which a program is recorded. The computer-readable medium may be any type of recording device in which data that can be read by a computer system is stored. Examples of the computer-readable medium include a Hard Disk Drive (HDD), a Solid State Drive (SSD), a Silicon Disk Drive (SDD), a Read Only Memory (ROM), a Random Access Memory (RAM), a Compact Disc (CD)-ROM, a magnetic tape, a floppy disk, an optical data storage, and a carrier wave (e.g., data transmission over the Internet). The controlling operation may be implemented with execution of the stored computer-readable code or software by a processor.

It will be apparent to those skilled in the art that various modifications and variations can be made in the present disclosure without departing from the spirit or scope of the disclosure. Thus, the present disclosure is intended to cover the modifications and variations of this disclosure provided they come within the scope of the appended claims and their equivalents.

What is claimed is:

1. A vehicle Audio Video Navigation (AVN) system for changing an audio output mode, the AVN system comprising:
   a wireless communication module configured to set a streaming channel through a wireless connection to a smart device;
   a voice data analyzer configured to detect whether a navigation announcement voice and music are included in streaming data received through the streaming channel without prioritizing between the navigation announcement voice and the music; and
   a processor configured to change the audio output mode to a first mode for outputting streaming audio, upon determination that both the navigation announcement voice and the music are present in the streaming data received from the smart device,
   wherein the first mode is a mode in which only the streaming audio is output through a vehicle speaker.

2. The vehicle AVN system according to claim 1, further comprising:
   a head unit audio; and
   a sound mixer configured to mix sound of the head unit audio and sound included in the streaming data,
   wherein the processor changes the audio output mode to a second mode for outputting the mixed sound, only upon determination that the navigation announcement voice is present as a detection result, and
   wherein the second mode is a mode in which at least the navigation announcement voice is output through the vehicle speaker.

3. The vehicle AVN system according to claim 2, wherein the first mode includes a Bluetooth streaming mode and the second mode includes an audio mode.

4. The vehicle AVN system according to claim 1, wherein the wireless communication module includes a Bluetooth module.

5. The vehicle AVN system according to claim 4, wherein the streaming channel includes an Advanced Audio Distribution Profile (A2DP) channel.

6. The vehicle AVN system according to claim 1, wherein the voice data analyzer determines that the music is present when irregular sound is continuously output from the streaming data for a predetermined time or more.

\* \* \* \* \*